United States Patent
Muckley

(10) Patent No.: US 6,550,053 B1
(45) Date of Patent: Apr. 15, 2003

(54) TIME ESTIMATOR FOR OBJECT ORIENTED SOFTWARE DEVELOPMENT

(75) Inventor: Stuart Muckley, Reading (GB)

(73) Assignee: International Computers Limited, London (GB)

(*) Notice: Subject to any disclaimer, the term of this patent is extended or adjusted under 35 U.S.C. 154(b) by 0 days.

(21) Appl. No.: 09/543,242

(22) Filed: Apr. 5, 2000

(30) Foreign Application Priority Data

Apr. 21, 1999 (GB) ............................................. 9909020

(51) Int. Cl.$^7$ ................................................. G06F 9/44
(52) U.S. Cl. ........................ 717/100; 702/102; 702/186; 705/9
(58) Field of Search ......................... 717/100; 702/102, 702/186; 707/500, 203; 705/9

(56) References Cited

U.S. PATENT DOCUMENTS

| | | | |
|---|---|---|---|
| 5,495,430 A | * 2/1996 | Matsunari et al. | 700/100 |
| 5,771,179 A | * 6/1998 | White et al. | 1/1 |
| 5,815,638 A | * 9/1998 | Lenz et al. | 706/15 |
| 5,918,219 A | * 6/1999 | Isherwood | 705/37 |
| 5,930,798 A | * 7/1999 | Lawler et al. | 707/102 |
| 5,960,196 A | * 9/1999 | Carrier et al. | 717/122 |
| 6,027,112 A | * 2/2000 | Guenther et al. | 271/194 |
| 6,219,805 B1 | * 4/2001 | Jones et al. | 714/25 |

OTHER PUBLICATIONS

Hanakawa, Noriko, Morisaki, Syjui, and Matsumoto, Ken–i–chi, "A Learning Curve Based Simulation Model for Software Development", Graduate School of Information Science, Nara Instute of Science and Technology, Japan, IEEE, 1998, retrieved Sep. 16, 2002.*

Hughes, R. T., Cunliffe, A., Young–Martos, F., "Evaluating software development effort model–building techniques for applicatio in a real–time telcommunications environment", IEE Proceedings 1998, retrieved from IEEE database Sep. 16, 2002.*

Kemerer, Chris F. "An Empirical Validation of Software Cost Estimation Models", Communications of the ACM, 1987, retrieved from the ACM database Sep. 16, 2002.*

Srinivasan, Krishnamoorthy and Fisher, Douglas, "Machine Learning Approaches to Estimating Software Development Effort", IEEE Transactions on Software Engineering, vol. 21, No. 2, Feb. 1995, retrieved from the IEEE database, Sep. 16, 2002.*

Fairley, Richard E., "Recent Advances in Software Estimation Techniques", 1992 ACM p382–391, retrieved from the ACM database Dec. 16, 2002.*

\* cited by examiner

Primary Examiner—Anil Khatri
Assistant Examiner—Mary Steelman
(74) Attorney, Agent, or Firm—Barnes & Thornburg

(57) ABSTRACT

A method of estimating the time a particular designer or any one of a group of designers will take to realize a new design using an object-oriented methodology. The particular version, for each designer, or group of designers, of a formula which links time taken and the number of predetermined types of object-oriented elements, each element type having a respective multiplier for each designer or group of designers, is determined by "training" using the number of the elements employed and the actual time taken, for a number of previous designs, realized by that designer or group of designers. For the new design, the numbers of the elements to be present is determined and this data inserted into the formula with the respective designer's designers' multipliers and an estimate of time obtained.

10 Claims, 3 Drawing Sheets

TIME ESTIMATOR FOR OBJECT ORIENTED SOFTWARE DEVELOPMENT

BACKGROUND OF THE INVENTION

This invention relates to estimating software systems development, that is to say how long it will take to realise (code/program) a design, in particular an object-oriented design.

Every commercial project needs a tool by which resources can be allocated effectively to produce the implementation of a design. This results in both lower risk and better utilization of assets. This can be achieved by expert opinion, where an expert in the domain, i.e. the programming language and design style can produce an opinion of the total time to completion. However, in new domains, where the design process/style and/or coding language have changed, a new metrics tool is required and preferably one which is not solely based on human guesswork, that is inheritance multiplied by some magic number means X days in total, and/or the number of lines of code or other dynamic implementation based attributes.

A known technique for obtaining a time estimate involves use of Function Point Analysis (FPA), which attempts to measure the software from the point of view of the software consumer rather than the software producer. Function point methodology is based on the amount of function delivered to the user rather than counting lines of code. Implementation is a two-stage process. First, data on existing projects is recorded in a database. Second, the project to be estimated is compared with the projects in the database using regression analysis or ranking to determine the man-hours estimate. Function point analysis uses statistical correlation to predict the amounts of effort required to build a system. The project's key measures are evaluated with statistical correlation. First, the size of completed project is determined by counting up function points (each form, report and table is assigned a number based on how many fields are in that object). The hours spent building the project are added up, resulting in two numbers: function points and effort. Regression analysis determines the extent to which these numbers are correlated. If they are sufficiently related then one has an equation which converts function points to man hours.

Whilst this approach can produce reasonable results (time estimates), it is considered that some of the elements used are rather obscure, others relate to things that are indeterminate until you have commenced coding and in general that this FPA approach is not sufficiently related to particular projects, each of which is individual. Furthermore, every designer is individual and they work differently to one another.

SUMMARY OF THE INVENTION

According to one aspect of the present invention there is provided a method of estimating the time a particular designer or any one of a group of designers will take to realise a new design using an object-oriented methodology, including the step of determining for the particular designer or group of designers the appropriate version of a formula which links the time estimate and the numbers of predeterminated types of object-oriented elements present in a design, each element type having a respective multiplier for the particular designer or group of designers associated with it, wherein values for the respective multipliers are calculated from the numbers of the object-oriented elements of each type that the particular designer or group of designers employed in a plurality of previous designs and the actual realisation times for those designs, and including the steps of inserting the numbers of each of the types of the object-oriented elements present in the new design in the appropriate version of the formula and evaluating the formula, thereby obtaining the time estimate.

According to another aspect of the present invention there is provided a method of estimating the time a particular designer or any one of a group of designers will take to realise a new design using an object-oriented methodology, including the steps of (a) for each of a plurality of previous designs produced by said designer or any one of the group of designers, storing data regarding the number of object-oriented elements of predetermined types employed and the actual time taken in a database;

(b) applying the numbers data for a first previous design to a formula which links the time estimate and the numbers of the predetermined types of object-oriented elements, each element type having a respective multiplier for the said designer or group of designers associated with it, selecting initial random values for the multipliers and performing multiple iterations, whilst adjusting the values of the multipliers, until a best-fit between a respective estimated time and the actual time taken for the first previous design is achieved;

(c) applying the numbers data from a second previous design and the values of the multipliers obtained in step (b) and corresponding to the best fit to the formula, performing multiple iterations, whilst adjusting the values of the multipliers, until a best fit between the respective estimated time and the actual time taken for the second previous design is achieved;

(d) calculating the average values of the multipliers from the values obtained in steps (b) and (c);

(e) applying the numbers data from a third previous design and the average values obtained in step (d) to the formula, performing multiple iterations, whilst adjusting the values of the multipliers, until a best fit between a respective estimated time and the actual time for the third previous design is achieved;

(f) repeating steps (d) and (e) until the data from all of the plurality of past designs have been employed, and repeating step (d) for last two previous designs of the plurality;

(g) analyzing a new object-oriented design, for which a time estimate is required, to determine the numbers data therefor, and (h) applying the numbers data for the new design, together with the average values for the multipliers determined for the last two previous designs of the plurality in step (f), to the formula, and evaluating the formula to provide the time estimate for the new design.

According to a further aspect of the present invention there is provided a data carrier incorporating a computer program for performing a method of estimating the time a particular designer or any one of a group of designers will take to realise a new design using an objected-oriented methodology, the method including the step of determining for the particular designer or group of designers the appropriate version of a formula which links the time estimate and the numbers of predeterminated types of object-oriented elements present in a design, each element type having a respective multiplier for the particular designer or group of designers associated with it, wherein values for the respective multipliers are calculated from the numbers of the object-oriented elements of each type that the particular designer or group of designers employed in a plurality of previous designs and the actual realisation times for those designs, and including the steps of inserting the numbers of each of the types of the object-oriented elements present in the new design in the appropriate version of the formula and evaluating the formula, thereby obtaining the time estimate.

According to yet another aspect of the present invention there is provided a data carrier incorporating a computer program for performing a method of estimating the time a particular designer or any one of a group of designers will take to realise a new design using an objected-oriented methodology, the method including the steps of (a) for each of a plurality of previous designs produced by said designer or any one of the group of designers, storing data regarding the number of object-oriented elements of predetermined types employed and the actual time taken in a database;

(b) applying the numbers data for a first previous design to a formula which links the time estimate and the numbers of the predetermined types of object-oriented elements, each element type having a respective multiplier for the said designer or group of designers associated with it, selecting initial random values for the multipliers and performing multiple iterations, whilst adjusting the values of the multipliers, until a best-fit between a respective estimated time and the actual time taken for the first previous design is achieved;

(c) applying the numbers data from a second previous design and the values of the multipliers obtained in step (b) and corresponding to the best fit to the formula, performing multiple iterations, whilst adjusting the values of the multipliers, until a best fit between the respective estimated time and the actual time taken for the second previous design is achieved;

(d) calculating the average values of the multipliers from the values obtained in steps (b) and (c);

(e) applying the numbers data from a third previous design and the average values obtained in step (d) to the formula, performing multiple iterations, whilst adjusting the values of the multipliers, until a best fit between a respective estimated time and the actual time for the third previous design is achieved;

(f) repeating steps (d) and (e) until the data from all of the plurality of past designs have been employed, and repeating step (d) for last two previous designs of the plurality;

(g) analyzing a new object-oriented design, for which a time estimate is required, to determine the numbers data therefor, and (h) applying the numbers data for the new design, together with the average values for the multipliers determined for the last two previous designs of the plurality in step (f), to the formula, and evaluating the formula to provide the time estimate for the new design.

BRIEF DESCRIPTION OF THE DRAWINGS

Embodiments of the invention will now be described with reference to the accompanying drawings, in which.

SPECIFIC DESCRIPTION OF THE PREFERRED EMBODIMENTS

As mentioned above, each project is individual and each designer is individual, they work differently. One may create many objects whereas another may create only a small number. It is thus considered that it is more appropriate to produce a time estimate, for a particular project (object-oriented design) which is to be handled by a particular designer, based on that designer's past performance, since this will take into account that designer's method of working, although it is equally applicable to a group of skilled designers who work in basically the same manner.

To facilitate understanding, an example of an object will first be considered. An address is an element used in a Local Government taxation scenario, for example the address of a property for Council tax purposes. An address, to the man in the street, is a single object or entity, but it is actually made up of many objects, each representing different things. Quite how one decides to "sub-divide" such an object will affect how many individual objects, classes, methods, attributes etc, are involved and from a programming point of view how long it will take to realise (program) the overall object.

Figure 1:
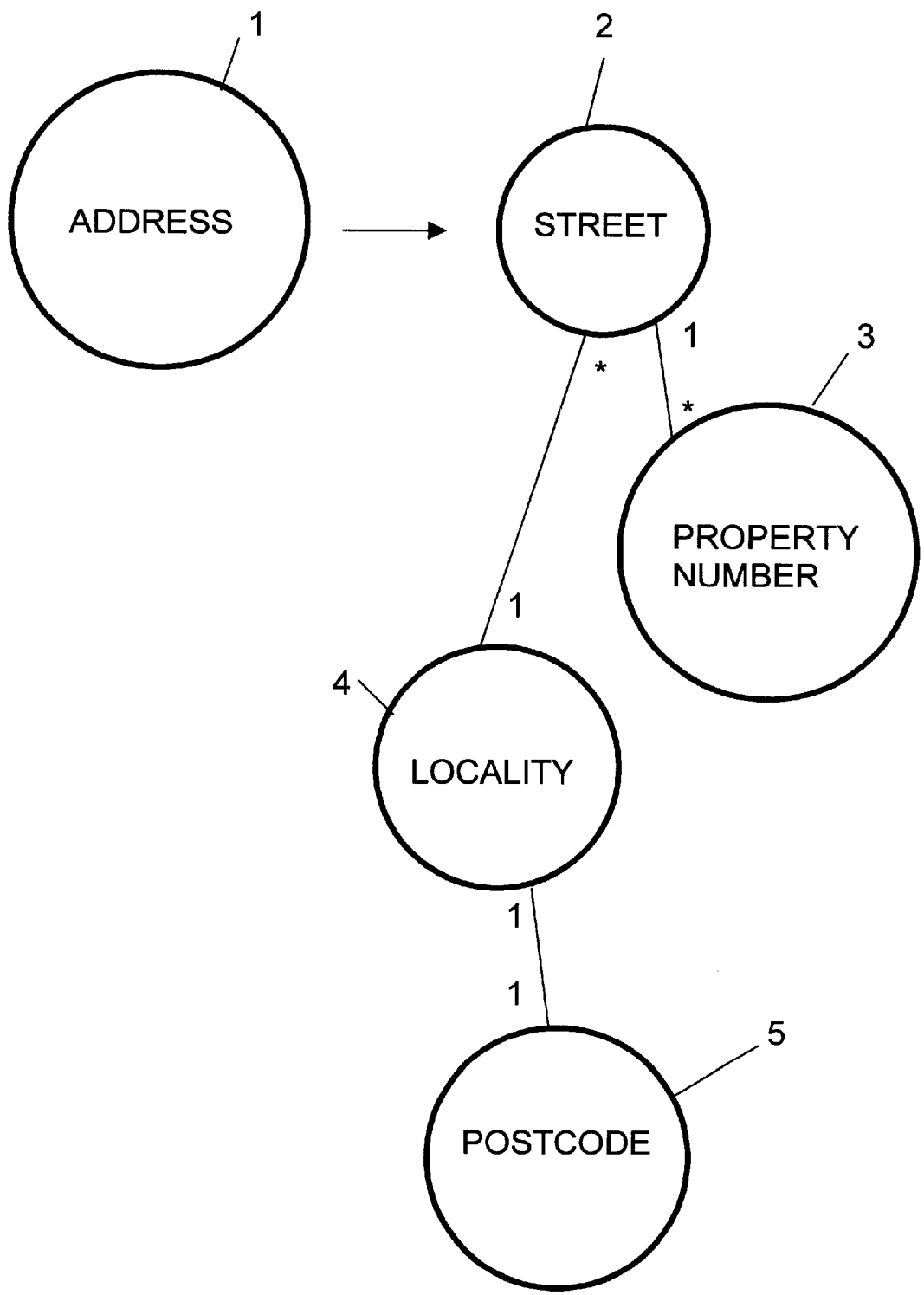
FIG. 1 illustrates an example object and its constituent elements.

The address object 1 of FIG. 1 is equivalent to a number of objects. As illustrated there is a street object 2, associated with which is a property number object 3. The street is in a town or city, hence there is a locality object 4, and associated with the address is a postcode, hence there is a postcode object 5. The symbols "*" and "1" indicate a many-to-one relationship between objects. The right hand part of FIG. 1 can thus be taken as meaning there are zero or more properties on a street, there are many streets in a locality but the locality corresponds to one postcode.

From a programming point of view one has to consider how these objects correspond and what kind of data they contain as well as what methods they employ. A street has a street name and may be considered, according to the Post Office, as a sub or main through-fare, hence the street object 2 contains data corresponding to name and type of thoroughfare. A particular designer will break a design down in a particular way corresponding to his/her method of working, eg. creating more or less objects than another designer. In particular one can consider the time taken for a particular object-oriented design to be related to "object" matters, typically the number of classes (# classes), the number of methods on interfaces (# methods), the number of attributes, the total number of methods, and object interaction data, typically eight elements in total, and the time taken for the overall design by a particular designer or any of the group of designers to comprise a formula including each of these elements multiplied by a respective multiplier for that designer or group, summed and divided by a divisor, in the example given below i.e.

$$time = \frac{(\#classes)*A + (\#methods)*B + \ldots}{Z} \qquad (i)$$

By finding the values for the eight multipliers, A, B . . . etc, and the divisor Z which are appropriate for actual projects where the actual time taken by an individual designer or one of the group is known, a version of the formula for use in estimating the time for future designs, can be obtained.

Formula (i) was derived by considering the premise that the time taken is proportional to the complexity of a project. For example, a hypothetical complexity factor might be:

number of lines of code*number of inherited classes*number of methods in which case the time taken could be:

a number*complexity factor

Although the length of time spent on implementation of a design is partially dependent on domain specific issues, generally it is fairly easy to identify several specific areas which are possibly well suited to be measures of the complexity of a particular design. In an object based design environment the number of inherited classes and the total number of classes are two factors which are a measure of the complexity of a design. In a normal, imperative-based, design environment, complexity factors could relate to a number of functional areas, if using a design system such as Yourdon Structured Design, or levels of functional decomposition, in a top-down/functionally decomposed design method.

However, using only a few factors is at best ill-advised, although the more factors used the more complicated the calculation will become. Some factors may have little effect on the total time to implement, whereas others can have a dramatic effect. It is considered that six or more sensible factors is probably most appropriate.

From these factors one can create an estimation formula of the form:

Time to implement=Complexity/some amount

Where Complexity=∫<factor $N$>*<multiplier $N$>

It is then necessary to identify factors for incorporation into the formula. For a particular project they were identified as the number of methods, the number of methods on public facing interfaces, the number of classes, the number of inherited classes, the number of attributes, the number of classes within a collection (referencing their container class), the number of classes within a collection (not referencing their container class), the number of classes with an association with another class (where the other class also has an association with the original), and the number of classes with an association with another class. Thus there are nine factors and a total of ten unknown values (nine multipliers and one divisor) for this project; the time to implement comprising the sum of each of the above factors multiplied by its respective multiplier, with the total divided the divisor.

Finding appropriate values for the multipliers and divisor is simply an optimisation problem. Optimisation problems can be solved in many ways, for example, by use of neural networks (especially Hopfield-Tank networks), generic algorithms, simple search, random walk and hill-climbing. Different strategies are applicable to different problems but the last three options are the simplest. A simple search is the easiest to implement but the slowest to perform as it simply evaluates every option possible. Random walking is also very easy but its performance varies greatly. Hill-climbing is a well known, and consistently used, strategy for optimisation. It is reasonably efficient, normally produces good results and is easy to implement. In fact, a hill climber is simply a specialised form of the random walk strategy.

To find the multiplier and divisor values, data regarding previous designs is required, in particular the time to implement and complexity data from the chosen domain and using the same tools as a new design for which a time estimate is required. For example for the particular project referred to above data from objects which had already been coded were available and could be used to find the multiplier and divisor values appropriate for another object.

Figure 2A:
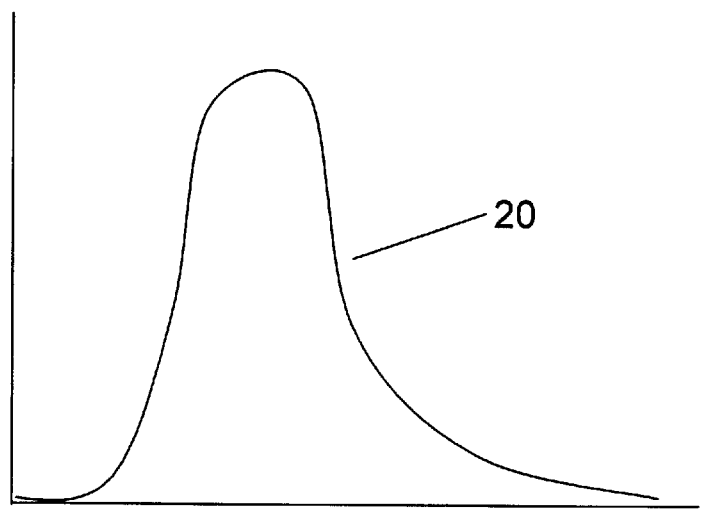
FIG. 2a illustrates a simple case and FIG. 2b illustrates a complex case with two "hills"
Figure 2B:
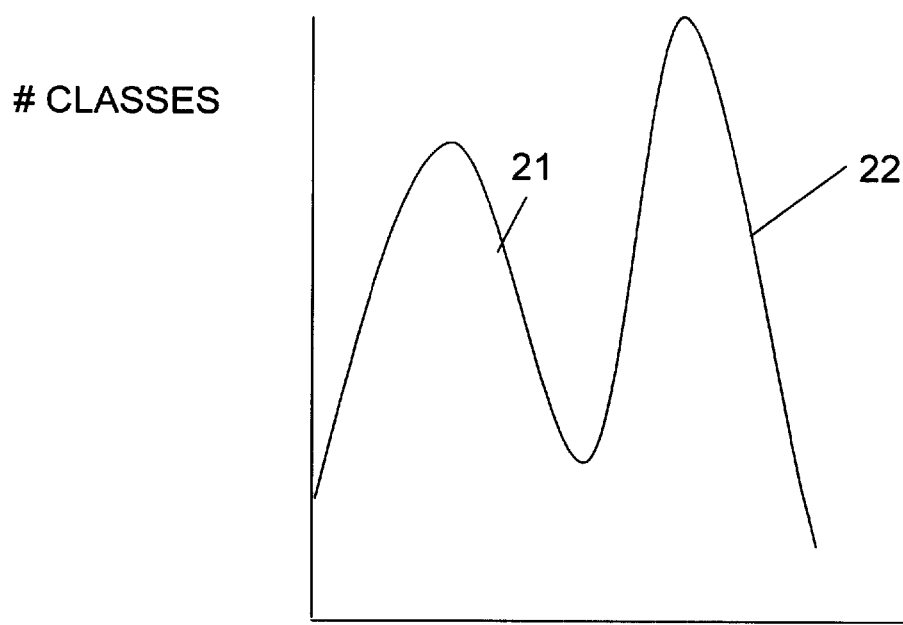

A theoretical construct to aid the understanding of hill climbing techniques is the "complexity landscape", also known as the problem/fitness landscape. For optimisation of a simple case, the landscape could be as in FIG. 2a, with a single hill 20. A more complex case is shown in FIG. 2b, albeit still only in two-dimensions. In either case the climber always attempts to "climb" up a slope, preferably the steepest in multi-dimensions, to attain the best solution to the problem. The curve in FIG. 2b highlights the essential problem with hill climbing. If the start point is at the bottom of hill 21 and the hill-climber climbs to the top of that hill, its mandate being to only move in a direction in which it can get to a higher point, then it will stop at the top of hill 21, even though hill 22 is higher. It will thus not find the optimum solution. Whereas in the simple case of FIG. 2a, it does not matter where the start point is, the top of hill 20 will always be reached. However, if there were say ten attempts at the problem, each starting at a different randomly generated position of FIG. 2b, then the conclusion would be that statistically the top of hill 22 should be reached at least once. Hence if the hill-climber algorithm is allowed to modify one of its multipliers and if this change causes the estimates to be better, then a good fit can be found.

Finding appropriate values for the multipliers and divisor A, B etc, thus is simply an optimisation problem. One solution is to use a hill-climber algorithm, since the expression for time given above (formula(i)) can be considered as a multi-dimensional surface with hills and troughs.

Initially the multipliers A, B, C, D, E, F, G and H, in an eight element case, and Z are given values selected at random and the number of classes, methods etc as used by the designer or any one of group of designers for a previous project employed. The hill-climber algorithm is then used to adjust the values of the multipliers and divisor until, in effect, the top of one of the hills is reached, the hill-climber always looking for the best way forward, and a calculated value of time taken can be compared with the actual time taken for the previous project. If these differ wildly, such as calculated at 20 days but actually took 70 days, then the values used do not possibly correspond to the highest hill on the multidimensional surface. The hill-climber algorithm can then change one of the values slightly and start the calculation process again to see if a closer match can be achieved. If the values are within ±7½% then the algorithm is being effective. It is the standard deviation of the results which is of main interest not the actual times. FIG. 2b illustrates, albeit for a two dimensional case for simplicity, a possible graph of number of classes versus number of days which has two "hills". Depending on the starting point the hill climber could reach the top of the lower hill, rather than the higher hill, and the time estimate will therefore not be as good as it could have been.

The values of the multipliers and divisor determined by the hill-climber algorithm for one previous project, are then combined with the number of classes etc for another project carried out by the same designer or any one of the group of designers and a time calculated for that other project. This is compared with the actual time as before and the multiplier and divisor values adjusted as appropriate by the hill-climber algorithm in an attempt to achieve a better match. This is repeated for say a total of ten previous projects in order to "train" the hill-climber algorithm to the method of working of the designer or the group of designers and produce an appropriate time estimate formula for that designer or any one of the group of designers.

Figure 3:
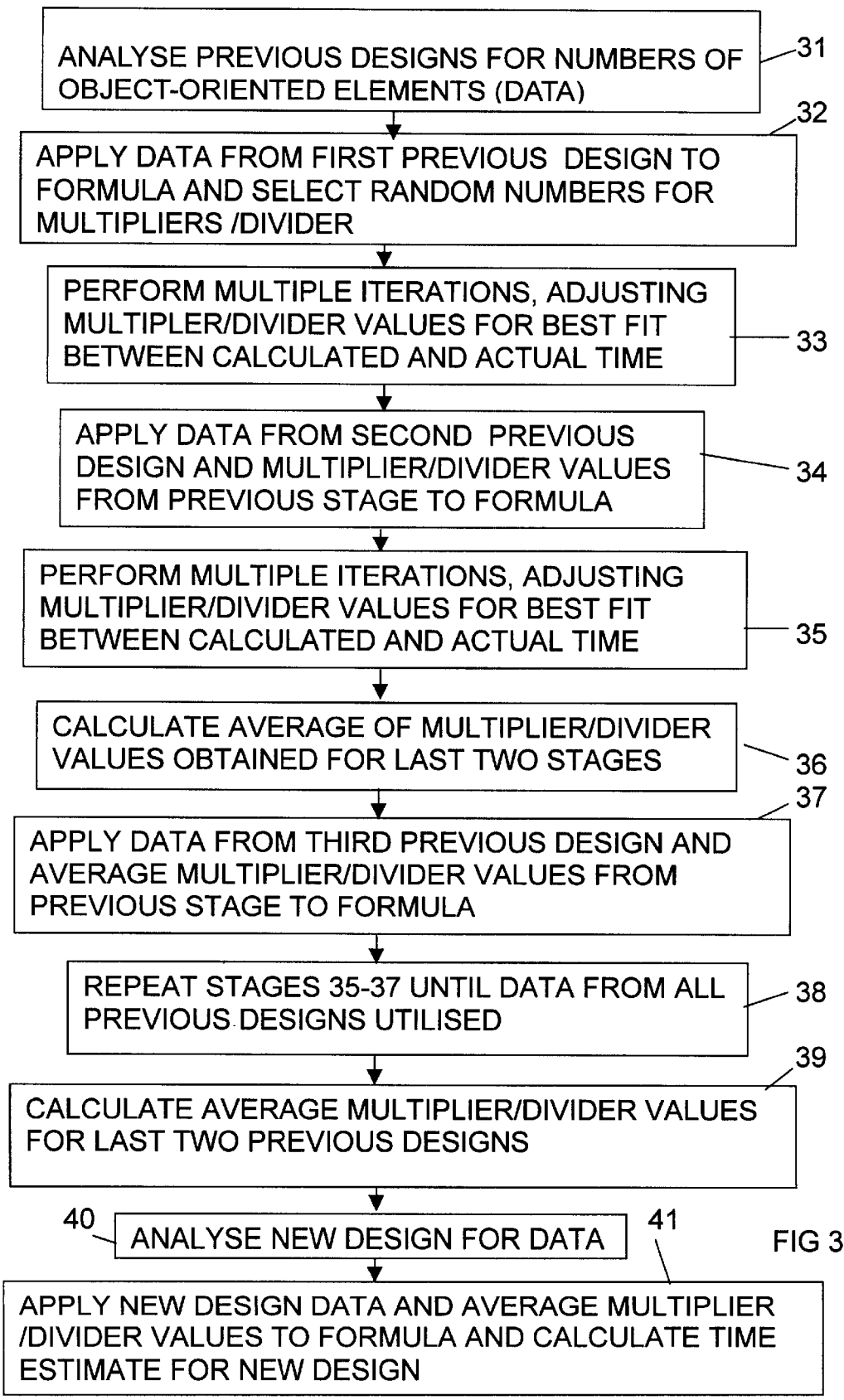
FIG. 3 illustrates the basic steps of the time estimation process.

When it is desired to obtain a time estimate for a new project, it is simply a question of determining the number of classes etc, and the values of A to H and Z from the latest training session may be used with them to calculate the time estimate from the above formula. However, since later calculated values can differ quite significantly from the previously calculated values, it is preferable to use the average values of A to H and Z taken from the previous two training sessions, when performing the next training session or actually performing a time estimation for a new design. In order to accommodate nuances in the designer's or designers' technique which are introduced over time, and to get better at estimating, the actual time taken and also numbers etc for each successive project carried out by a particular designer or any one of group of designers should be employed in order to calculate an up-to-date formula for that designer or any one of group of designers. Whereas the algorithm has been referred to as a hill-climber algorithm, this is not the only possibility, as discussed above, the main criteria being that it produces a "best-fit" result within an acceptable period of time, i.e. uses an acceptable number of iterations. In the following the basic steps of the process of time estimation are described with reference to FIG. 3:

(a) analyse each of a number of past object-oriented designs produced by a particular designer or any one of the group of designers and which took a known amount of time, and store data details comprising number of classes, number of methods on interfaces, number of attributes, total number of methods and object interaction data in a table of a database, together with actual time taken (step 31);

(b) apply data details for a first past design to the formula (i), select random values for multipliers A to H and divisor Z (step 32) and perform multiple iterations to calculate the time from the formula, adjusting the values of A to H and Z between iterations, until a respective best-fit between the calculated time and the actual time taken is achieved (step 33);

(c) apply values of A to H and Z determined in step (b) and the data details for a second past design to the formula (i) (step 34), perform multiple iterations to calculate the time from the formula, adjusting the values of A to H and Z between iterations, until a respective best-fit between the calculated time and the actual time taken is achieved (step 35);

(d) calculate the average values of A to H and Z from the last two respective best-fit calculations, namely the respective values for the first and second designs (step 36);

(e) apply the average values of A to H and Z calculated in step (d) and the data details for the next, namely third, past design to the formula (i) (step 37), perform multiple interactions to calculate the time from the formula, adjusting the values of A to H and Z between iterations, until a respective best-fit between the calculated time and the actual time taken is achieved;

(f) repeat (d) and (e) until all past designs have been employed (step 38), then repeat (d) for the last two past designs (step 39);

(g) analysis an object-oriented new design for which a time estimate is required, breaking it down into number of classes, number of methods on interfaces etc as for the past designs to produce corresponding data details (step 40) and (h) apply the data details of the new design to the formula and together with the average values of A to H and Z calculated from the last two past designs, and evaluate the formula to provide the time estimate for the new design (step 41).

The above process may be carried out on a computer having a database into which the data and time details can be inserted and running a program serving to perform iterations resulting in the best-fit values, for example a hill-climber algorithm. Whereas multipliers and a divisor are referred to in the above as separate item, alternatively the values of the multipliers can comprise values which take the divisor into account, eg A/Z, B/Z etc.

In summary, the invention involves estimating for a UML (Unified Method Language), or any other object-design methodology, design, the total time that a particular skilled programmer or any one of group of programmers will take to realize (code/program) the design. A formula for the time estimate is constructed, by training an algorithm, particularly a simple hill-climber, on past data (say 10 actual implementations by that particular designer or any one of group designers) which formula links the number of classes, number of methods on enterfaces, number of attributes, total number of methods, and object interaction data, with the total time taken. Thus when a new project is started, once the data details (number of classes etc) have been decided, an appropriate time estimate can be calculated. This can be refined, as the project progresses, if the numbers change, thereby improving the accuracy of the time estimate.

I claim:

1. A method of estimating the time a particular designer or any one of a group of designers will take to realise a new design using an object-oriented methodology, including the step of determining for the particular designer or group of designers the appropriate version of a formula which links the time estimate and the numbers of predeterminated types of object-oriented elements present in a design, each element type having a respective multiplier for the particular designer or group of designers associated with it, wherein values for the respective multipliers are calculated from the numbers of the object-oriented elements of each type that the particular designer or group of designers employed in a plurality of previous designs and the actual realisation times for those designs, and including the steps of inserting the numbers of each of the types of the object-oriented elements present in the new design in the appropriate version of the formula and evaluating the formula, thereby obtaining the time estimate.

2. A method as claimed in claim 1, wherein the values of the multipliers are calculated using a hill-climber algorithm.

3. A method as claimed in claim 1, wherein the values of the multipliers employed in any one instance of the formula comprise the average of the values calculated for the two preceding previous designs.

4. A method as claimed in claim 2, wherein the multipliers initially comprise randomly selected values, and the hill-climber algorithm adjusts the multiplier values until a best-fit between an estimated time and an actual realization time is reached.

5. A method as claimed in claim 1, wherein the types of object-oriented elements comprise classes, methods on interfaces, attributes, methods, corresponding to the total number of methods employed, and object interaction data.

6. A method of estimating the time a particular designer or any one of a group of designers will take to realise a new design using an object-oriented methodology, including the steps of (a) for each of a plurality of previous designs produced by said designer or any one of the group of designers, storing data regarding the number of object-oriented elements of predetermined types employed and the actual time taken in a database;

(b) applying the numbers data for a first previous design to a formula which links the time estimate and the numbers of the predetermined types of object-oriented elements, each element type having a respective multiplier for the said designer or group of designers associated with it, selecting initial random values for the multipliers and performing multiple iterations, whilst adjusting the values of the multipliers, until a best-fit between a respective estimated time and the actual time taken for the first previous design is achieved;

(c) applying the numbers data from a second previous design and the values of the multipliers obtained in step (b) and corresponding to the best fit to the formula, performing multiple iterations, whilst adjusting the values of the multipliers, until a best fit between the respective estimated time and the actual time taken for the second previous design is achieved;

(d) calculating the average values of the multipliers from the values obtained in steps (b) and (c);

(e) applying the numbers data from a third previous design and the average values obtained in step (d) to the formula, performing multiple iterations, whilst adjusting the values of the multipliers, until a best fit between a respective estimated time and the actual time for the third previous design is achieved;

(f) repeating steps (d) and (e) until the data from all of the plurality of past designs have been employed, and repeating step (d) for last two previous designs of the plurality;

(g) analyzing a new object-oriented design, for which a time estimate is required, to determine the numbers data therefor, and (h) applying the numbers data for the new design, together with the average values for the multipliers determined for the last two previous designs of the plurality in step (f), to the formula, and evaluating the formula to provide the time estimate for the new design.

7. A method as claimed in claim 6, wherein a hill-climber algorithm is used to adjust the values of the multipliers and perform the multiple iterations, whereby to find the values of the multipliers corresponding to best fit between the estimated time and the actual time taken for previous designs.

8. A method as claimed in claim 6, wherein the types of object-oriented elements comprise, classes, methods on interfaces, attributes, methods, corresponding to the total number of methods employed, and object interaction data.

9. A data carrier incorporating a computer program for performing a method of estimating the time a particular designer or any one of a group of designers will take to realise a new design using an object-oriented methodology, the method including the step of determining for the particular designer or group of designers the appropriate version of a formula which links the time estimate and the numbers of predetermined types of object-oriented elements present in a design, each element type having a respective multiplier for the particular designer or group of designers associated with it, wherein values for the respective multipliers are calculated from the numbers of the object-oriented elements of each type that the particular designer or group of designers employed in a plurality of previous designs and the actual realisation times for those designs, and including the steps of inserting the numbers of each of the types of the object-oriented elements present in the new design in the appropriate version of the formula and evaluating the formula, thereby obtaining the time estimate.

10. A computer readable medium incorporating a computer program for performing a method of estimating the time a particular designer or any one of a group of designers will take to realise a new design using an objected-oriented methodology, the method including the steps of (a) for each of a plurality of previous designs produced by said designer or any one of the group of designers, storing data regarding the number of object-oriented elements of predetermined types employed and the actual time taken in a database;

(b) applying the numbers data for a first previous design to a formula which links the time estimate and the numbers of the predetermined types of object-oriented elements, each element type having a respective multiplier for the said designer or group of designers associated with it, selecting initial random values for the multipliers and performing multiple iterations, whilst adjusting the values of the multipliers, until a best-fit between a respective estimated time and the actual time taken for the first previous design is achieved;

(c) applying the numbers data from a second previous design and the values of the multipliers obtained in step (b) and corresponding to the best fit to the formula, performing multiple iterations, whilst adjusting the values of the multipliers, until a best fit between the respective estimated time and the actual time taken for the second previous design is achieved;

(d) calculating the average values of the multipliers from the values obtained in steps (b) and (c);

(e) applying the numbers data from a third previous design and the average values obtained in step (d) to the formula, performing multiple iterations, whilst adjusting the values of the multipliers, until a best fit between a respective estimated time and the actual time for the third previous design is achieved;

(f) repeating steps (d) and (e) until the data from all of the plurality of past designs have been employed, and repeating step (d) for last two previous designs of the plurality;

(g) analyzing a new object-oriented design, for which a time estimate is required, to determine the numbers data therefor, and (h) applying the numbers data for the new design, together with the average values for the multipliers determined for the last two previous designs of the plurality in step (f), to the formula, and evaluating the formula to provide the time estimate for the new design.

* * * * *